March 23, 1926. 1,577,482
T. MIDGLEY
CORE HANDLING APPARATUS
Original Filed April 7, 1921    4 Sheets-Sheet 3
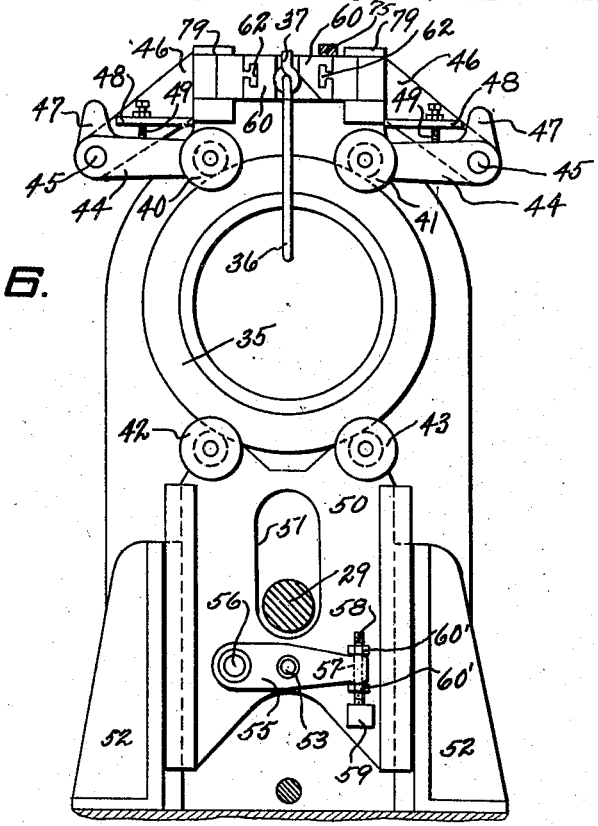
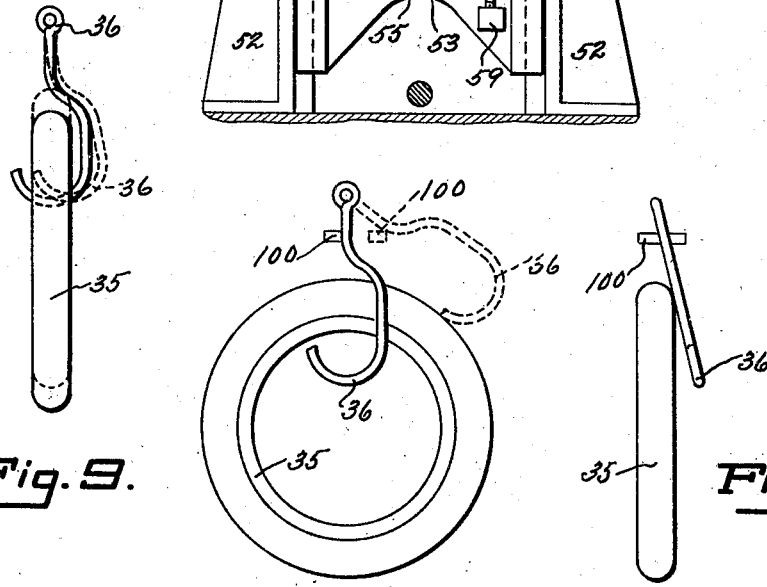
INVENTOR
Thomas Midgley
BY
Edward C. Naylor
ATTORNEY March 23, 1926.
T. MIDGLEY
1,577,482
CORE HANDLING APPARATUS
Original Filed April 7, 1921   4 Sheets-Sheet 4
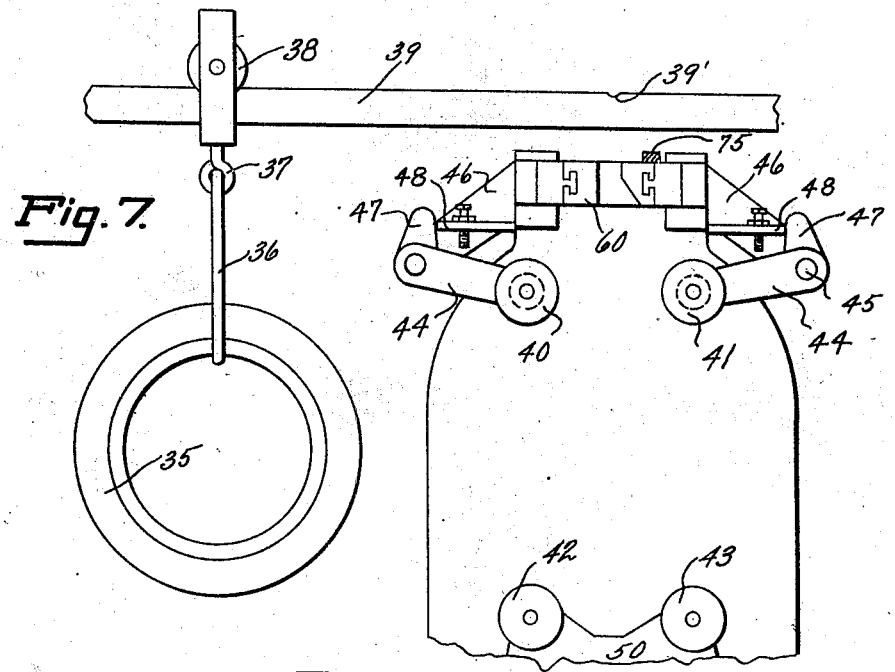
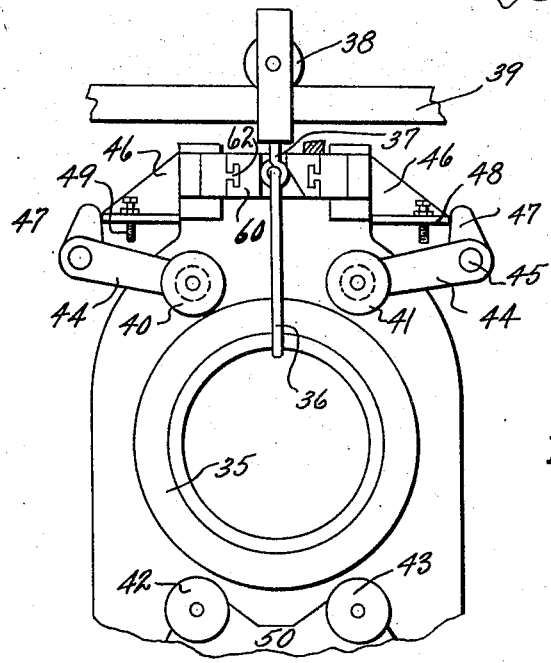
INVENTOR
Thomas Midgley
BY
ATTORNEY Patented Mar. 23, 1926.

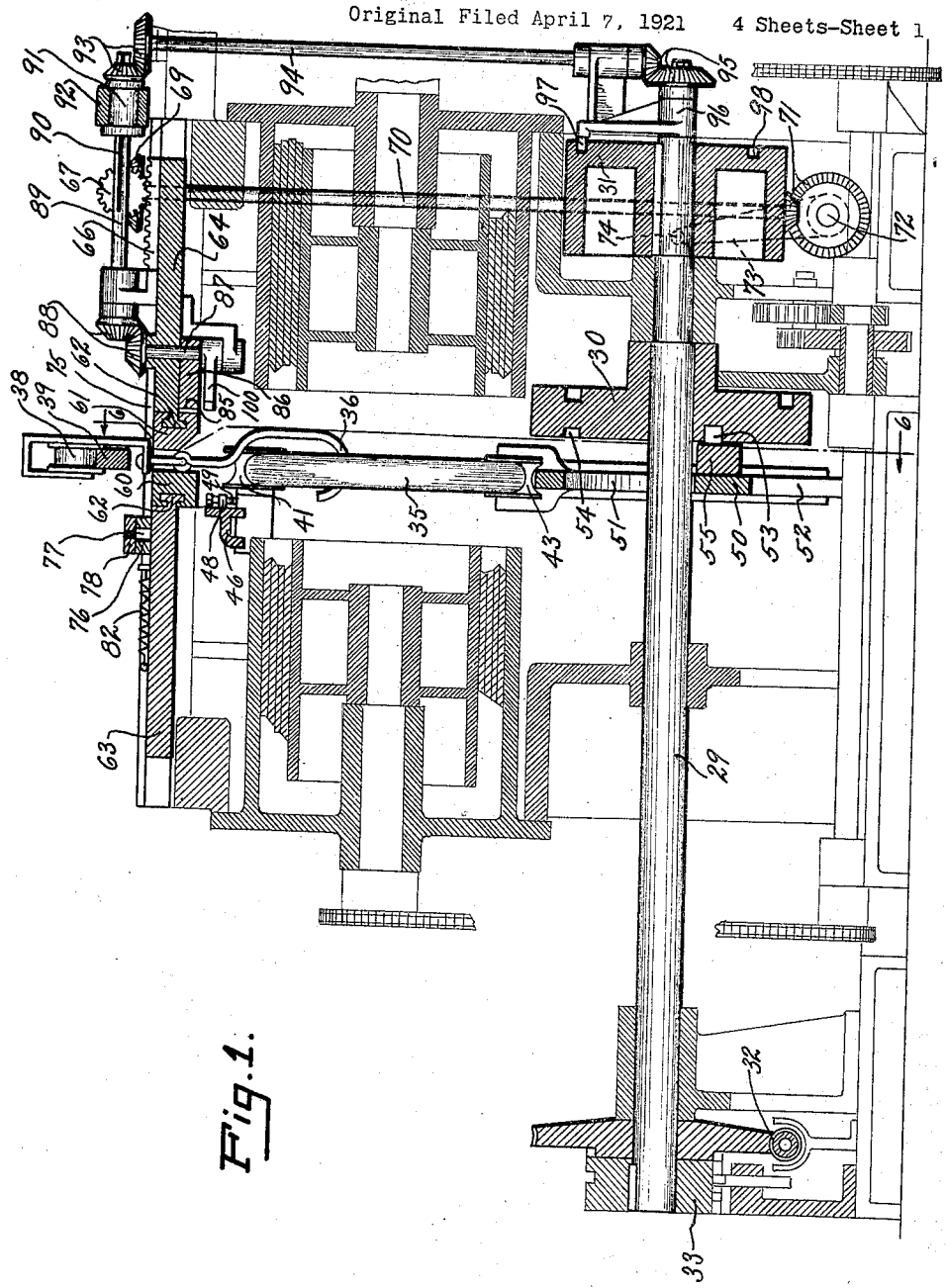

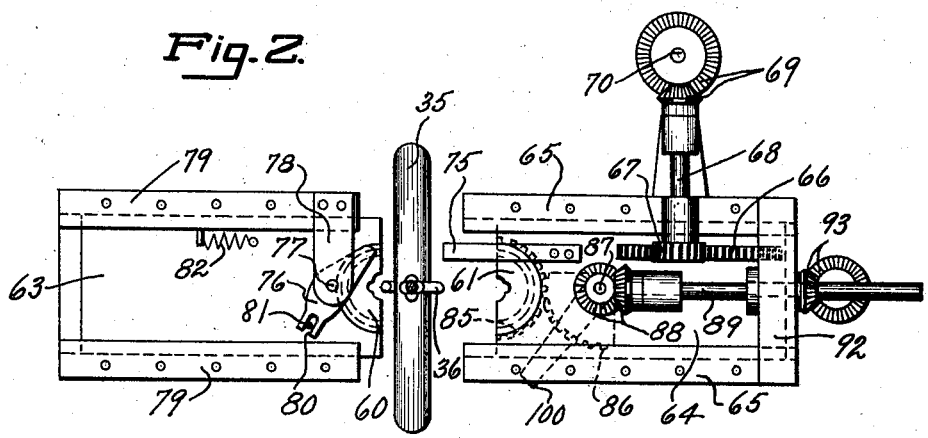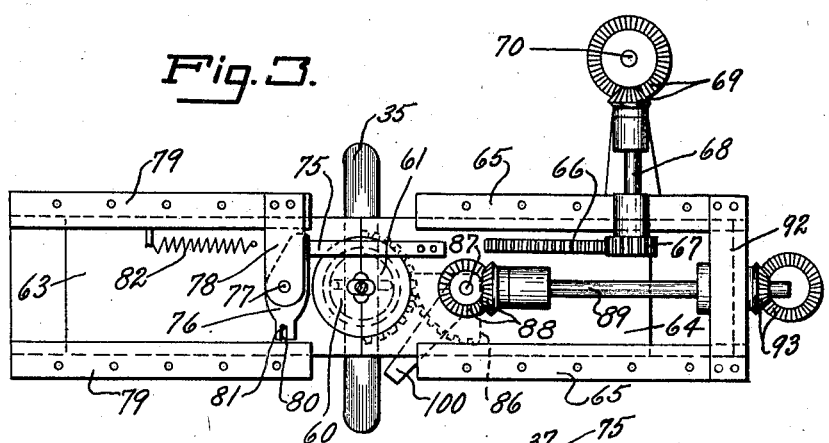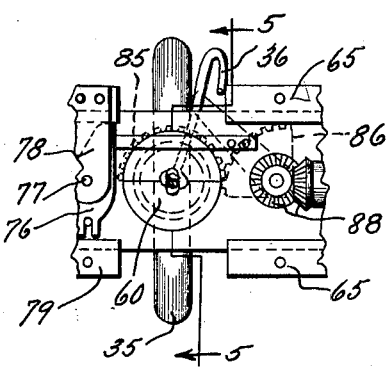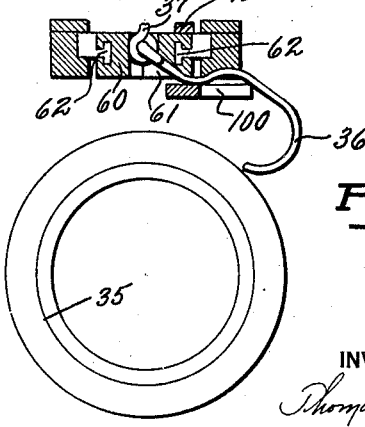

1,577,482

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

CORE-HANDLING APPARATUS.

Original application filed April 7, 1921, Serial No. 459,330. Divided and this application filed March 5, 1924. Serial No. 696,955.

*To all whom it may concern:*

Be it known that I, THOMAS MIDGLEY, a citizen of the United States of America, residing at Hampden, in the county of Hampden and State of Massachusetts, have invented certain new and useful Improvements in Core-Handling Apparatus, of which the following is a specification.

My invention relates to core holding devices and has for its object an effective apparatus for positioning and manipulating tire forming cores. This application is a division of my prior application Serial No. 459,330, filed April 7, 1921, now Patent Number 1,558,904, issued Oct. 27, 1925.

The present invention provides a machine for effectively raising and lowering the core from a hook on an overhead track, and a device for supporting the core during the tire building operation. It also provides a device for moving the core carrying hook away from the core during the tire building operation.

Additional objects, advantages, and features of the invention will appear from the construction, arrangement, and combination of the parts as indicated in the following description and in the accompanying drawings, in which Fig. 1 is a sectional elevation of a tire building machine in which the core handling apparatus is shown in heavy black lines;

Fig. 2 is a detail top plan thereof showing the hook clamping mechanism prior to clamping the core carrying hook;

Figs. 3 and 4 are successively later stages in the same operation;

Fig. 5 is a section substantially on line 5—5 of Fig. 4;

Fig. 6 is a section on line 6—6 of Fig. 1;

Figs. 7 and 8 are partial views similar to Fig. 6, illustrating successive stages in moving the core into position for clamping the mechanism to act on it; and Figs. 9, 10, and 11 are diagrammatic views showing how the core carrying hook is moved out of operation prior to the shaping of the tire.

Carried by the frame of the machine are bearings in which is journaled the main shaft 29 carrying cams 30 and 31 which will be referred to. This shaft may be driven as through a worm and wheel 32 from a suitable source of power, preferably through a clutch mechanism 33 of the type which, when the control lever is actuated, will permit the mechanism to run through one complete cycle and will then cause it to stop. Such clutches are old and their construction need not be further described.

Cores 35 are supplied to the machine in any desired or convenient way. In the preferred embodiment of my invention, however, I contemplate supplying the cores on hooks 36 connected by swivels 37 to carriages 38 running on a track 39, and provide mechanism which will now be described for supporting the core and temporarily removing the hook from a position in which it would interfere with the operation of the devices for shaping the fabric to the sides of the core. When the core is delivered to the machine it is stopped approximately in position either by hand or automatically, as by providing track 39 with a depression 39' in which carriage 38 will lodge, and is then grasped by rollers 40, 41, 42, and 43, each of these having concave surfaces conforming to the outside of the core. Rolls 40 and 41 are each rotatably mounted on an arm 44 pivoted at 45 to a bracket 46 on the frame of the machine. An ear 47 on each arm 44 contacts with a ledge 48 on the bracket 46 to limit the downward movement of the rolls, an adjustable stop 49 on ledge 48 limiting the upward movement. The rolls are moved downward by their own weight and upward by contact with the core, which is raised upwardly to free its hook by rolls 42 and 43.

These latter rolls are rotatably mounted on a slide 50, which is provided with an opening 51 enabling it to clear the shaft 29, and which runs on bearings 52 suitably secured in machine frame. A cam roll 53 carried by the slide 50 fits in a cam groove 54 in one face of cam 30 previously mentioned. In order to adjust accurately the position of the slide 50, cam roll 53 is preferably mounted on an arm 55 pivoted at 56 to the slide and having at its other end a hole 57 through which passes a threaded rod 58 secured to a bracket 59 on the slide. By this means the arm 55 can be rotated on its pivot 56 and held by nuts 60' on the rod in its adjusted position, in order to locate accurately the vertical position of the cam roll 53 in respect to slide 50 and hence the position into which the core 35 is raised by the rolls 42 and 43.

After the core has been raised by the mechanism described above from the position of Fig. 8 to the position of Fig. 6, the hook 36 is free to be moved clear of the core and out of the way of the fabric shaping devices by the hook handling mechanism which will be described. As the core is placed in the proper position on the track to be seized by the rolls and preferably before rolls 42 and 43 start to raise the core off the hook, the swivel of the hook is grasped by clamping means comprising opposed semi-circular clamping jaws 60 and 61, each slidably mounted on a semi-circular dove-tailed guide 62 on slides 63 and 64 respectively.

Slide 64 is mounted for reciprocation in guides 65 carried by the frame of the machine, and is provided with a rack 66 meshing with a pinion 67 on a short shaft 68 driven through bevel gears 69 from a vertical shaft 70. This latter shaft receives oscillatory rotation through bevel gears 71 from a shaft 72 carrying an arm 73 on which is pivoted a cam roll 74 running in a cam groove on the cylindrical surface of cam 31. This cam, acting through the intermediate mechanism described, serves to move slide 64 toward and away from the center of the machine, whereby clamp 61 is caused to move into and out of clamping position.

Clamp member 60 is moved into and out of clamping position coincidentally with clamp member 61 by mechanism operated by the motion of slide 64. This slide carries an abutment 75 which, when the slide is moved towards the center of the machine, impinges against a lever 76 pivoted at 77 to a bracket 78 secured to the guides 79 in which slide 63 reciprocates. The end of lever 76 opposite that against which abutment 75 contacts is forked as at 80 to receive a pin 81 mounted on slide 63. Slide 63 is normally held in its retracted or non-clamping position as shown in Fig. 2 by a spring 82 secured at one end to the slide and at the other to a stationary part of the machine, but as slide 64 is moved toward clamping position the lever 76 acts through pin 81 to move slide 63 into clamping position against the tension of the spring.

Clamps 60 and 61 have mating clamping surfaces which are shaped to conform to the swivel position of the core supporting hook, and are adapted for rotation on their dove-tail guides 62 in order to swing the hook, when the latter is freed by the raising of the core from its position transverse to the plane of the core (Figs. 1, 6, and 8) to a position substantially parallel to the plane of the core (Figs. 4, 5, 10, and 11). For this purpose clamping member 61 is provided with gear teeth 85 which mesh with a segmental gear 86 on a shaft 87 journaled in slide 64 and connected by gearing 88 with a horizontal shaft 89. This shaft is splined or keyed as at 90 to a sleeve 91 journaled in a bearing 92 supported by the frame. The sleeve 91 is connected by gearing 93 with a vertical shaft 94 which in turn is connected through gearing 95 with an arm 96 rotatably mounted on the main frame and having a cam roll 97 running in a cam groove 98 in the end face of cam 31. By the above train of mechanism the clamping member 61, and through contact with it clamping member 60, will be rotated so as to turn the hook 36 substantially 90° on its swivel, or from the position of Fig. 9 to that of Fig. 10.

Shaft 87 which carries the segmental gear 86 also carries an arm 100 serving to move the hook from the full to the dotted line position of Fig. 11 or the full line position shown in Figs. 4 and 5 during the latter part of the rotating movement of the clamping members. After the fabric shaping mechanism has completed its operation the hook 36 is swung back into its original position in which it can support the core by a reversal of the operations previously described for swinging the hook into inoperative position. Rolls 42 and 43 are then caused to descend, thus repositioning the core in place upon the hook. During part of this lowering of the core, rolls 40 and 41 follow it down by gravity, their flanged sides furnishing lateral support for the core.

The general operation of the core handling machine is as follows: A core carried by a hook 36 is brought into place ready to be grasped by the positioning rolls, and the swivel of the hook is seized by clamping members 60 and 61. Rolls 42 and 43 are then caused to rise, lifting the core against rolls 40 and 41 so that the core is held in a central position for operation upon by the fabric shaping mechanism. The vertical motion of the core may shift the hook from the full to the dotted line position of Fig. 9, depending upon the shape of the hook. As the core is grasped by its positioning rolls the clamping members 60 and 61 are rotated, swinging the hook from the dotted line position of Fig. 9 to the position shown in Fig. 10 and in full lines in Fig. 11. As, or even before, this motion is completed arm 100 contacts with the hook and swings it to the dotted line position of Fig. 11 or the position shown in Fig. 5, thus leaving the sides of the core free for the operation of the fabric shaping mechanism.

The core handling apparatus is adapted for use in connection with any form of tire building operation. For example, the lifting and guiding rolls may rotatably support the core so that it may be operated upon by the usual type of spinning or stitching rolls. In this case the core could be rotated by a friction roll contacting with its surface, and it would not be necessary to swing the hook completely out of the way as where it is desired to conform the fabric to the core by circumferentially simultaneous pressure.

Having thus described my invention, I claim:

1. In combination with a trackway, a carriage adapted to run on the trackway, a hook swiveled to the carriage and adapted to support an annular core, means to raise free of said hook a core carried thereby, means to grasp the hook, means to rotate the hook about its swiveled connection, and means to swing the rotated hook clear of the core.

2. In combination with a trackway, a carriage adapted to run on the trackway; a hook swiveled to the carriage and adapted to support an annular core; means to raise free of the hook a core carried thereby; and means to move the hook clear of the core comprising opposed clamping jaws, means to move the jaws together to grasp the swivel of the hook, means to rotate the jaws, and a member constructed and arranged to swing the hook clear of the core.

3. In combination with a trackway; a carriage adapted to run on the trackway; a hook swiveled to the carriage and adapted to support an annular core; means to raise free of the hook a core carried thereby; and means to move the hook clear of the core comprising opposed slides, a segmental clamping jaw rotatably mounted in each slide, means to move the slides together to grasp the swivel portion of the hook, means to rotate the segmental clamping jaws, and a member constructed and arranged to swing the hook clear of the core.

4. In combination with a support for a core, a plurality of concave rollers arranged to contact with the lower portion of a core on such support, means for raising said rollers to lift the core off the hook, a plurality of concave rollers adapted to contact with the upper portion of the core, and supports for the last named rollers constructed and arranged to allow them a limited vertical movement.

5. A machine of the class described adapted for use in connection with a trackway from which cores may be supported by hooks, comprising a vertically reciprocable slide, a cam roll adjustably mounted on the slide, a pluarality of concave rollers carried by the slide and adapted to contact with the lower portion of a core, a plurality of concave rollers adapted to contact with the upper portion of the core, supports for the last named rollers constructed and arranged to allow them a limited vertical movement, means for adjusting the extent of such movement, and a cam constructed and arranged to move the slide vertically, whereby the core is raised and positioned free of the hook.

6. A machine of the class described adapted for use in connection with a trackway from which cores may be supported by swiveled hooks, comprising means to raise a core free of a hook, a pair of opposed slides, a semi-circular clamping member rotatably mounted in each slide and constructed and arranged to form a circular unit rotatable in the slides when the slides are brought together, at least one of said members being provided with gear teeth, a gear meshing with said teeth and adapted to cause rotation of said members, and means for causing said slides to approach and recede from each other.

7. A machine of the class described adapted for use in connection with a trackway from which cores may be supported by swiveled hooks, comprising means to raise a core free of a hook, a pair of opposed slides, a semi-circular clamping member rotatably mounted in each slide and constructed and arranged to form a circular unit rotatable in the slides when the slides are brought together, at least one of said members being provided with gear teeth, a gear meshing with said teeth and adapted to cause rotation of said members, and an arm movable with the gear and adapted to contact with the hook to swing it clear of the core.

8. A machine of the class described adapted for use in connection with a trackway from which cores may be supported by swiveled hooks, comprising means to raise a core free of a hook, a pair of opposed slides, a semi-circular clamping member rotatably mounted in each slide and constructed and arranged to form a circular unit rotatable in the slides when the slides are brought together, at least one of said members being provided with gear teeth, a gear meshing with said teeth and adapted to cause rotation of said members, means for reciprocating one of the slides, and means controlled by the motion of that slide for causing reciprocation of the second slide in the opposite direction.

9. A machine of the class described adapted for use in connection with a trackway from which cores may be supported by swiveled hook, comprising means to raise a core free of a hook, a pair of opposed slides, a semi-circular clamping member rotatably mounted in each slide and constructed and arranged to form a circular unit rotatable in the slides when the slides are brought together, means for rotating the unit so formed, means for reciprocating one of the slides, an abutment fixed on that slide, a lever pivoted to a stationary part of the machine and adapted to contact at one end with said abutment, and connections between the other end of the lever and the second slide whereby said second slide is reciprocated upon the reciprocation of the first slide but in the opposite direction.

10. In combination with a trackway, a carriage adapted to run on the trackway, a hook swiveled to the carriage and adapted to support an annular core, means constructed and arranged to contact with the lower portion of the core to raise it clear of the hook, and means constructed and arranged to contact with the upper portion of the core to guide it during its vertical movement and assist in holding it in its raised position.

THOMAS MIDGLEY.